D. D. TULLOCH.
BOLT AND NUT LOCK.
APPLICATION FILED OCT. 24, 1913.
1,097,484.
Patented May 19, 1914.
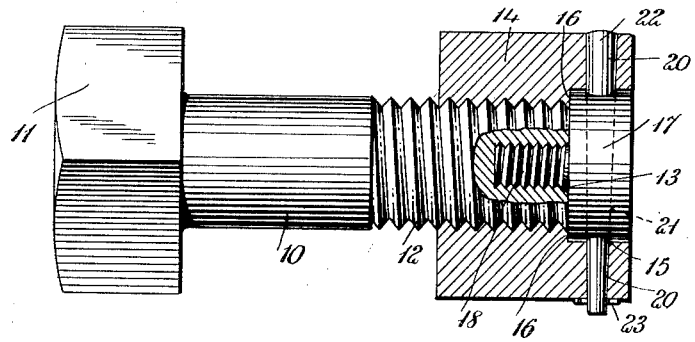
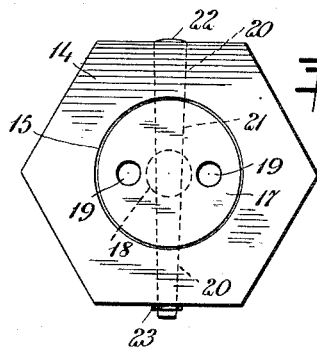
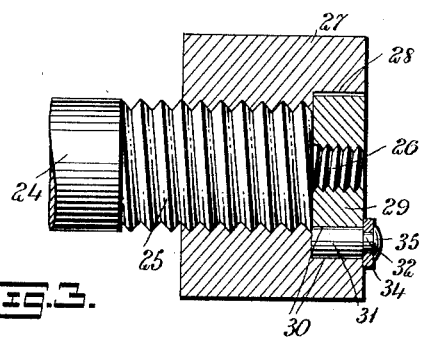
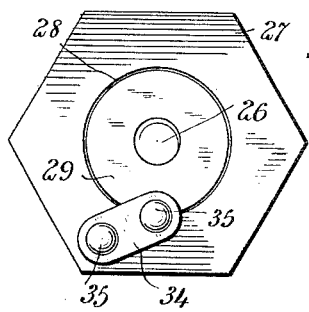
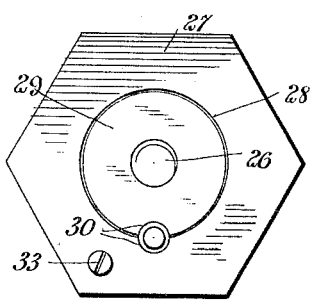
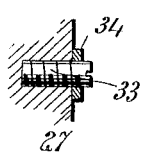
WITNESSES
INVENTOR
David D. Tulloch
BY
ATTORNEYS

UNITED STATES PATENT OFFICE.

DAVID D. TULLOCH, OF NEWARK, NEW JERSEY.

BOLT AND NUT LOCK.

1,097,484.  Specification of Letters Patent. Patented May 19, 1914.

Application filed October 24, 1913. Serial No. 797,031.

*To all whom it may concern:*

Be it known that I, DAVID D. TULLOCH, a subject of the King of Great Britain, and a resident of Newark, in the county of Essex and State of New Jersey, have invented a new and Improved Bolt and Nut Lock, of which the following is a full, clear, and exact description.

This invention relates to an improved bolt and nut lock, the device embodying improved means of this character for preventing displacement of a bolt with respect to the objects held and also displacement of the nut on the bolt, the improvement consisting more especially in the nut retaining means whereby the nut is held from turning in either direction.

A further object of the invention is to provide an improved bolt and nut lock in which a bolt of uniform dimensions with respect to the standard size bolts used is designed for coöperation with a nut of special design in that it is increased in thickness and counterbored to receive a plug attached to the bolt and forming means to lock the nut to the bolt against rotation.

With the above and other objects in view, the invention resides more particularly in the peculiar combinations and arrangement of parts which will be illustrated as a preferred embodiment in the accompanying drawings and described in the specification.

Reference is to be had to the accompanying drawings forming a part of this specification, in which similar characters of reference indicate corresponding parts in all the views, and in which—

Figure 1 is a side elevation of a bolt partly in section with the improved locking device applied thereto, the latter being also shown in section; Fig. 2 is a front elevation of the structure shown in Fig. 1 looking toward the locking device; Fig. 3 is a side elevation of a fragmentary portion of a bolt with a modified form of locking device applied thereto, the latter being shown in section; Fig. 4 is a front elevation of the structure shown in Fig. 3; Fig. 5 is a similar view but showing the device in place previous to the application of the plate employed to prevent outward displacement of the locking pin or key; and Fig. 6 is a sectional view of the nut illustrated in Fig. 4 to show the screw stud to which the plate last mentioned is anchored.

In the form of the invention illustrated in Figs. 1 and 2 of the drawings, the numeral 10 indicates a standard size bolt, usually $\frac{7}{8}''$ or $1''$ in diameter, as commonly used in railroad construction, although it is to be understood that the device is not limited to this particular use. The bolt is provided with the usual head 11 and standard size threads 12 for a portion of its length extending to its free end, which end is counterbored and threaded internally as shown at 13, such threads being cut left handed while the threads 12 are cut right handed, or vice versa, the essential feature being that the threads are cut in opposite directions. The nut 14 is engaged on the bolt and is made slightly thicker than the usual nut, being in the present instance preferably made $1\frac{3}{8}''$ thick while the usual nut is made $1''$ thick. This additional thickness provides for the counterboring of the nut as shown at 15, the counterbore being slightly larger than the threaded bore of the nut so as to provide a shoulder 16 designed to be contacted by a plug 17, preferably of circular form. This plug is provided with a reduced threaded stem 18 which is threaded in the counterbore 13 so as to lie flush with the face of the nut and is adapted to be secured in position by the engagement of a suitable tool or spanner wrench in a pair of recesses 19 in the outer face of the plug. The nut 14 is provided with diametrically opposed and tapering openings or seats 20 adapted to aline with a similar opening 21 transversely through the plug, whereby when the wedge pin or key 22 is forcibly passed through the same and held from displacement by a split pin or gib key 23 passed through an aperture of the pin 22, said last mentioned pin will be held from displacement, and as it serves to lock the plug to the nut, that is, two members which are oppositely threaded into position, it is obvious that their rotation will be absolutely prevented and that the nut will therefore be held from displacement.

In the form of the invention illustrated in Figs. 3, 4, 5 and 6 of the drawings the bolt 24 is provided with the usual right hand threads 25, but in lieu of being counterbored as heretofore described, is provided with a reduced extension 26 having left hand threads. A nut 27 is engaged on the bolt and is counterbored as shown at 28 to receive a circular or other plug 29 which is oppositely threaded with respect to the nut 27, on to the reduced threaded extension 26, and which lies wholly within the counterbore in the same manner as the plug 17, at the same time contacting with the end wall or shoulder of the counterbore in the nut. In order to lock the nut and plug together against rotation in this form of the invention, the plug and nut are provided with coacting semi-circular recesses or seats 30 in the peripheral edge of the plug and the inner edge wall of the counterbore, respectively, so as to receive a cylindrical pin or key 31 which is forced into the circular aperture produced by these co-acting recesses. This pin 31 is provided with a reduced portion 32 designed to extend normally beyond the face of the nut and plug and at a spaced point from this pin, the nut is provided with a threaded recess in which is engaged a threaded stud 33 in a manner to project from the face of the nut also. A connecting plate 34 is passed over the projecting ends of the pin and stud and by riveting or upsetting the ends of the pin and stud, as shown at 35, provide enlarged heads, displacement of the plate with respect to the pin and stud thus being obviated. Furthermore, since the nut and plug are oppositely threaded members and are held against independent rotation by the pin 31, their displacement from the bolt is obviously prevented, while the connecting plate 34 which is attached to the threaded stud serves as an anchoring means for the locking pin or key 31 so as to prevent its displacement outward with respect to the nut and plug.

The novelty of the present invention resides not only in the use of a device which calls for an increase in the relative sizes of the parts, but more especially in providing a locking device in which a nut is engaged on a bolt and provided with a counterbore enlarged with respect to the stem of the bolt to receive a plug which is oppositely threaded to the bolt internally or externally, together with improved means for locking the nut and plug together so that their independent rotation and displacement is quite impossible.

Having thus described my invention, what I claim as new and desire to secure by Letters Patent is:—

1. In a bolt and nut lock, the combination with a bolt having a threaded portion and a nut engaged thereon and provided with a circular counterbore; of a plug oppositely threaded to the bolt and snugly seated in the counterbore, and means engaged in co-acting openings of circular contour in the plug and nut for locking the plug to the nut and holding the latter against rotation of the bolt.

2. The combination with a bolt having a threaded stem and a nut threading thereon, said nut having an extension provided with an enlarged circular counterbore and forming an interior shoulder; of a circular plug oppositely threaded through the bolt and snugly seated in the counterbore with its outer face flush with the face of the nut, a locking key engaged in alined seats in the nut and plug, and means outwardly of the nut to hold the key from displacement.

In testimony whereof I have signed my name to this specification in the presence of two subscribing witnesses.

DAVID D. TULLOCH.

Witnesses:
GEORGE BASSET,
WM. G. HOAR.

---

Copies of this patent may be obtained for five cents each, by addressing the "Commissioner of Patents Washington, D. C."